United States Patent
Katayama et al.

[11] Patent Number: 6,044,628
[45] Date of Patent: Apr. 4, 2000

[54] WEB SEALING METHOD AND DEVICE, AND PACKAGING CONTAINER PRODUCING METHOD AND PACKAGING CONTAINER PRODUCING EQUIPMENT

[75] Inventors: Hiroshi Katayama; Akimasa Fujimoto; Hidekimi Yamamoto; Michio Ueda, all of Tokushima-ken, Japan

[73] Assignee: Shikoku Kakoki Co., Ltd., Tokushima-Ken, Japan

[21] Appl. No.: 09/112,108

[22] Filed: Jul. 8, 1998

[30] Foreign Application Priority Data

Jul. 9, 1997 [JP] Japan ..................... 9-183286

[51] Int. Cl.[7] .................. B65B 9/06; B65B 57/00
[52] U.S. Cl. ................... 53/552; 53/75
[58] Field of Search ................ 53/75, 551, 552, 53/371.6, 371.8

[56] References Cited

U.S. PATENT DOCUMENTS

| | | | |
|---|---|---|---|
| 3,925,139 | 12/1975 | Simmons | 53/75 |
| 5,147,491 | 9/1992 | Thomas et al. | 53/75 |
| 5,653,085 | 8/1997 | Suga | 53/75 |
| 5,678,390 | 10/1997 | Pruett et al. | |
| 5,836,136 | 11/1998 | Highberger | 53/75 |

FOREIGN PATENT DOCUMENTS 0 602 000 A1 6/1994 European Pat. Off. .

Primary Examiner—John Sipos
Assistant Examiner—Steven Jensen
Attorney, Agent, or Firm—Dike, Bronstein, Roberts & Cushman, LLP; David G. Conlin; William J. Daley, Jr.

[57] ABSTRACT

Featured is a web sealing device for controlling the sealing pressure so as to carry out a sufficient sealing while monitoring the sealing pressure directly acting on the web. Also featured is a packaging container producing equipment using the aforementioned sealing device and a packaging container producing method using the same. When sealing a part of web W by engaging hooks 16a, 16b, which directly give a sealing pressure to the web W in order to seal a part of both web N by heating and melting both side surfaces of a double web while pressing the same, the strain amount of the hooks 16a, 16b is measured by a strain gauge 23. and the aforementioned sealing pressure is controlled by the controller 21 so that the waveform of the data, in which the values obtained by converting the aforementioned measured strain amount to pressure are continuously recorded in line with the elapse of time, becomes nearly identical to that of the master data, reflecting on the compressing time by the hooks 16a, 16b, compression timing, and the pressing force of the cylinder 18 for actuation of the hooks, and the adjustment of the drive amount of the drive device for the cross sealing of a pair of sealing jaws 7a, 7b.

2 Claims, 7 Drawing Sheets

① EXCLUSION OF THE LIQUID REMAINED IN THE SEAL AREA
② HEATING  ③ COOLING  ④ CUTTING  ⑤ HOLDING
⑥ PRESSING AT A SEAL AREA OF WEB

WEB SEALING METHOD AND DEVICE, AND PACKAGING CONTAINER PRODUCING METHOD AND PACKAGING CONTAINER PRODUCING EQUIPMENT

BACKGROUND OF THE INVENTION

1. Field of the Invention

The present invention relates to a method and a device for sealing a doubled web while pressing the side thereof, and in particular relates to a packaging container producing method and equipment by which a plate-like web is molded to a tubular web, and contents such as fluid food, etc. are filled in the tubular web.

2. Description of the Related Art

Plate-like web wound like a roll is moved while being continuously unwound, in order to gradually mold it to be tubular, the web is continuously adhered to each other at the position where both ends thereof in the direction orthogonal to the lengthwise direction of the web slightly overlap, and a filling liquid such as a fluid food is filled therein. In order to continuously form packaging containers in which the filling liquid is fully filled, the packaging containers are enclosed below the level of the filling liquid and is sealed (cross sealed) in the direction orthogonal to the web lengthwise direction. Thereafter, nearly the central portion of the abovementioned cross-sealed part in its width direction is cut off. That is, by repeating a series of these operations, a liquid filling packaging container is formed, wherein finally, a parallel-hexahedral container is produced.

When filling a filling liquid such as fluid food into a web, two pairs of sealing jaws are provided, which cross seal a web in such a state that the web is pressed from both sides thereof, and the tubular web being transferred downward is put and nipped between the respective pairs of sealing jaws which move along with the web while pulling the web. After the sealing jaws shift down an appointed distance, nearly the central portion of the cross-sealing part is cut off as described above, and simultaneously the web sealing state is opened to cancel the downward transfer force of the tubular web, wherein the sealing jaws are caused to move in a direction of being spaced from each other, and elevated an appointed distance, and the process of sealing the tubular web is repeated.

Tubular web is composed of a multi-layered structure consisting of a polyethylene film layer, adhesive glue layer, aluminum foil layer, paper layer, and polyethylene film layer from the inside in that order. The cross sealing of the tubular web is carried out by heating and melting the polyethylene film layer using the abovementioned pair of sealing jaws.

A pair of sealing jaws consists of, for example, as shown in FIG. 2 and FIG. 3, a heat sealing jaw 7a for heat-sealing, and a pressure receiving jaw 7b to receive a compression force from the heat sealing jaw 7a (although, in FIG. 2, there is a pair of heat sealing jaw 7a and a pressure receiving jaw 7b, and there is a pair of a heat sealing jaw 7a' and a pressure receiving jaw 7b', hereinafter the description deals with only the pair of heat sealing jaw 7a and pressure receiving jaw 7b), an inductor 8 is provided at the contacting portion of the heat sealing jaw 7a with the web surface, and a pressure receiving bar 9 and a cutter 11, which cuts off the middle portion of the cross-sealed part in the width direction, are secured at the contacting portion of the pressure receiving jaw 7b with the web W. Furthermore, a hook 16a and a hook 16b are provided at both ends of the heat sealing jaw 7a and pressure receiving jaw 7b, respectively, wherein the hook 16a of the heat sealing jaw 7a is engaged with the hook 16b of the pressure receiving jaw 7b, and the engaging force in the cross sealing of web W nipped between the inductor 8 and pressure receiving bar 9 is controlled by adjusting the working oil pressure of a liquid pressure cylinder 18 of the hook 16a.

Subsequently, an eddy current is caused to flow to the aluminum foil of web W by the inductor 8 of the heat seal jaw 7a when both sides of the web are pressed by the heat seal jaw 7a and pressure receiving jaw 7b of a pair of seal jaws 7, wherein heat is generated by induction heating. With this heat, the polyethylene film layer is melted to cause the web W to be cross-sealed.

The cross sealing of web W is carried out by the following six processes as shown in FIG. 7.

(1) Exclusion of the filled liquid below the level in the web
(2) Heating at an appointed output for an appointed duration of time from the outside of web
(3) Cooling of the web
(4) Cutting at the cross-sealed portion (Separation of pillow-like containers)
(5) Holding of the web
(6) Pressing at an appointed level of pressure for an appointed duration of time Although the web is cross-sealed by the abovementioned six processes, as shown in FIG. 7, the pressing process in (6) is carried out to press the web throughout processes (1) through (5).

As shown in FIG. 8, exclusion of the filled liquid in the web at the abovementioned cross-sealing portion is a process for excluding the filled liquid remaining in the cross-sealing portion inside the web W when the heat seal jaw 7a and pressure receiving jaw 7b press both sides of web W.

Conventionally, the web pressing force for cross-sealing in the respective cycles (1) through (6) at the cross sealing process has been controlled while visibly checking the working oil pressure generator of liquid pressure cylinder 18 for adjusting the engaging force of hooks 16a and 16b with an analog type gauge. Therefore, the pressing force has not been controlled while checking the sealing pressure directly influenced on the web W.

In most cases, one cycle (1) through (6) is carried out in a very short time 1 second or less per hexahedral packaging container which is the final product.

However, in the abovementioned process of cross sealing below the liquid level, which is carried out in a very short time 1 second or less per packaging container, it was impossible to detect, in real time, whether or not the operation is reliably carried out every time.

SUMMARY OF THE INVENTION

It is an object of the invention is to detect occurrence of defective sealing in real time by directly monitoring the cross sealing pressure of the web below the level of the filled liquid and to easily search for causes of occurrence of abnormality based on the data stored in a memory.

And it is an object of the invention to provide sealing device free from any fear of occurrence of defects in the web molded products such as a packaging container, packaging container producing equipment, and method using the same sealing device.

The abovementioned object of the invention can be achieved by the following construction;

That is, the invention provides a web sealing method comprising the steps of measuring the strain amount of a member which directly gives webs a sealing pressure to seal a part of both webs by heating and melting both sides of a double web while pressing them; storing a value obtained by converting said measured strain amount to pressure as data continuously recorded in line with the elapse of time; and storing said data equivalent to an appointed number of times of the past web sealing operations, and a web sealing device comprising a strain measurement instrument secured at a member which directly gives a web a sealing pressure to seal a part of both webs by heating and melting both sides of a double web while pressing both sides thereof; and a data recording device for storing a value obtained by converting said measured strain amount of said strain measurement instrument to pressure as the data continuously recorded in line with the elapse of time, and for storing said data equivalent to an appointed number of times of the past web sealing operations.

In the abovementioned sealing method and device, it is favorable that data which is obtained by continuously recording the value obtained by converting the measured strain amount to pressure in line with the elapse of time is compared with the master data predetermined, wherein the sealing pressure is controlled so as to have a nearly identical waveform as that of the abovementioned master data.

Furthermore, the invention includes cases where the abovementioned web sealing method and device are applied to a packaging container producing method and packaging container producing equipment by which packaging containers having fluid contents filled in tubular web which is molded from a plate-like web.

As general factors to determine the sealing property of web W, there are (1) compressing time, (2) compressing temperature (heat energy) and (3) compression force of a compressing means for sealing. Of them, a drive device for sealing jaws takes over (1) compressing time and (3) compression force. In detail, an important factor of (1) compressing time to assure a complete sealing consists of the time in compressing of web W by sealing jaws during its transfer and a compression timing when the compression is commenced.

Generation of pressure of members (cam 12, etc. in FIG. 1) which constitutes the drive device of actual sealing jaws is carried out by compression instruction coming from the drive device of the sealing jaws (a drive motor (not illustrated) of shaft 6 in FIG. 1), and the compression force is controlled so that an appointed compression force can be generated for the predetermined duration of time by the abovementioned compression instruction.

Therefore, the compressing time and compression timing, which are factors of (1) compression time as factors influencing on the sealing property of web W are easily adjusted as controlling objects. However, (3) compression force itself acting on the web W by a pair of cams has not been directly measured in prior arts.

However, in this invention, a sealing pressure to seal a part of both webs by heating and melting both side surfaces of a double web while pressing them is directly given to the web, and furthermore the strain amount of members (for example, hook 16, etc. in FIG. 3) having few factors which may become a measurement error, wherein the values obtained by converting the abovementioned measured strain amount to pressure is stored as data continuously stored in line with the elapse of time, and the sealing state is monitored by comparing the abovementioned data with the preset master data.

Thus, the pressure acting on a web is directly measured, and the result thereof is reflected on adjustment of (1) compression time and compression timing, adjustment of the attaching position of members (cam 12 in FIG. 1, hook 16 in FIG. 3) which constitute the drive device of a pair of sealing jaws, and adjustment of a pressing force of members (for example, hook 16 in FIG. 3) which directly gives a sealing pressure to the web, wherein the sealing reliability of the web can be secured.

In a case where a web sealing device according to the invention is applied to a packaging container production machine for which very high accuracy is required for sealing operations carried out in a very short time (for example, within one second), there is no case where a defect is generated in the final packaging containers.

The present invention is applicable to not only production of hexahedral packaging containers but also production of gable-top packaging containers. Furthermore, the invention can be also used for sealing of webs such as plastic products.

BRIEF DESCRIPTION OF THE DRAWINGS

The above and other advantages of the invention will become more apparent from the following description taken in conjunction with the accompanying drawings wherein like reference numerals refer to like parts and wherein.

DETAILED DESCRIPTION OF EMBODIMENTS

A description is given of preferred embodiments of the invention.

Figure 1:
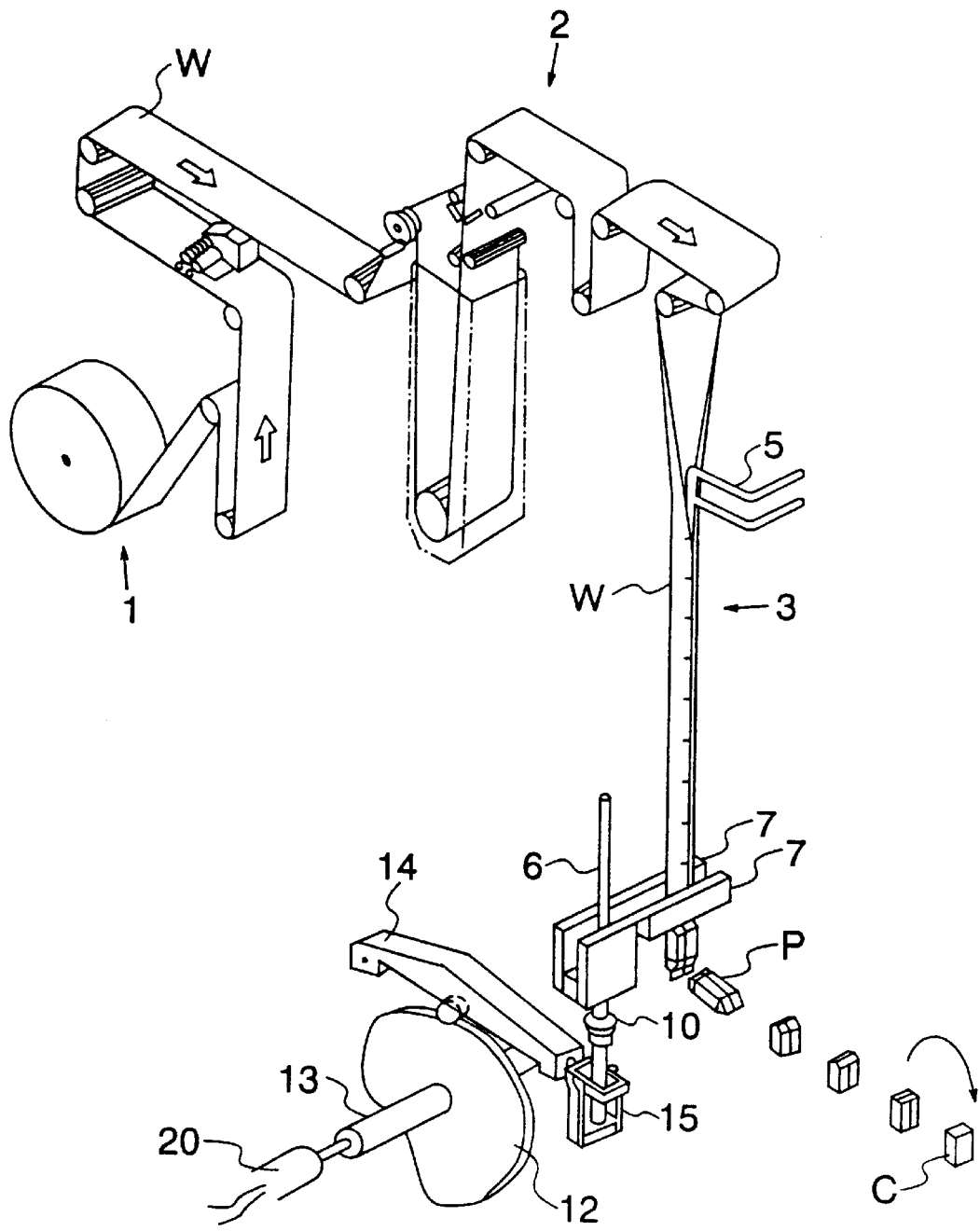
FIG. 1 is a sketch of a packaging container production machine for producing packaging containers, in which contents are filled, from plate-like web W according to a preferred embodiment of the invention.
Figure 2:
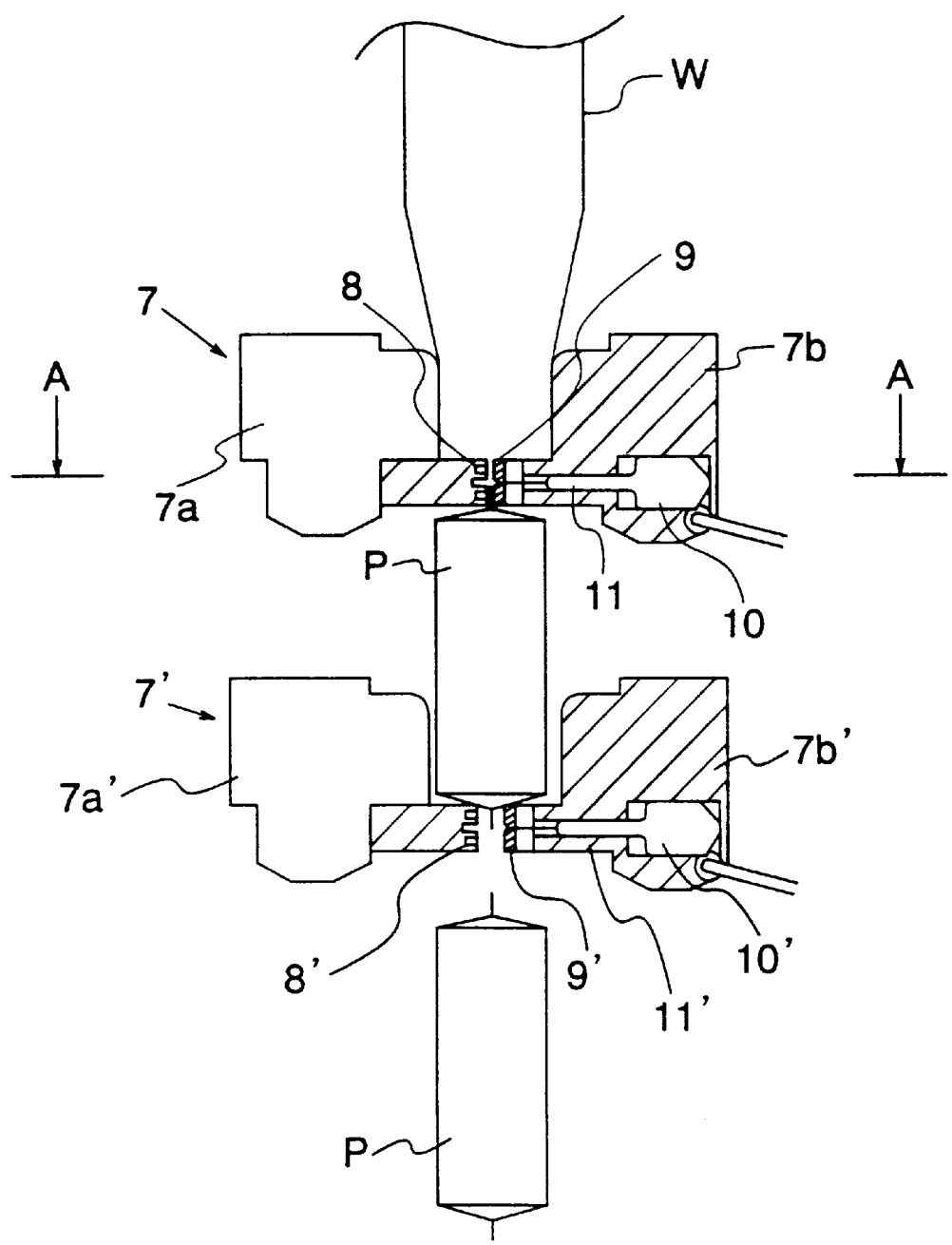
FIG. 2 is a side elevational view of sealing jaws consisting of two pairs of the packaging container producing equipment in FIG. 1.
Figure 3:
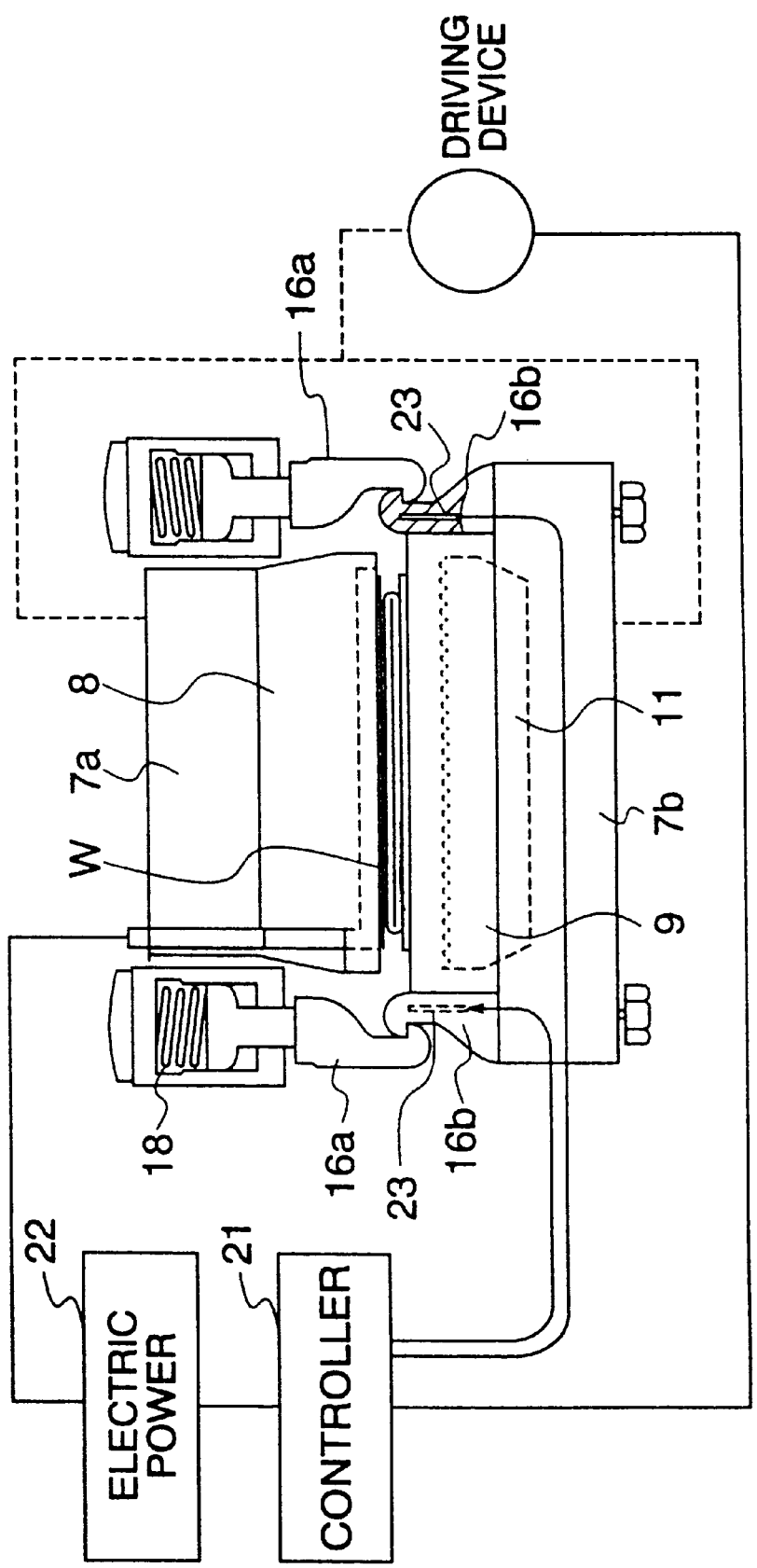
FIG. 3 is an operation controlling view of a high frequency heating system of the sealing jaws, which are taken along the line A—A in FIG. 2.
Figure 4:
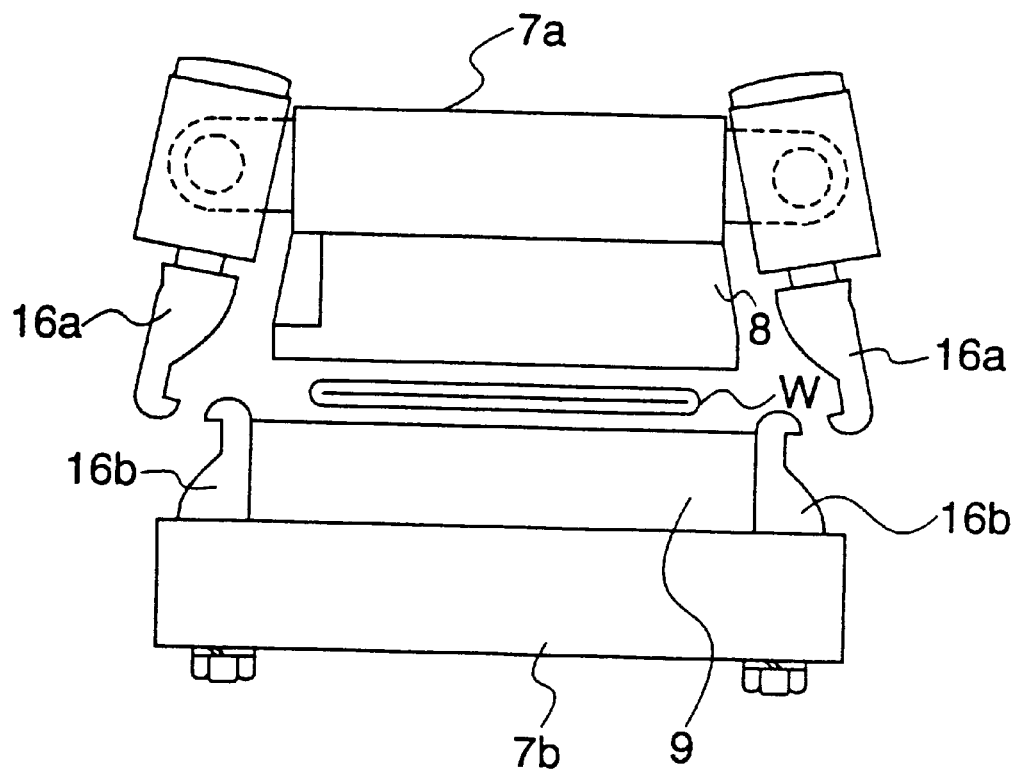
FIG. 4 is a view showing a state where the engagement of hooks of the sealing jaws in FIG. 3 is released.
Figure 5:
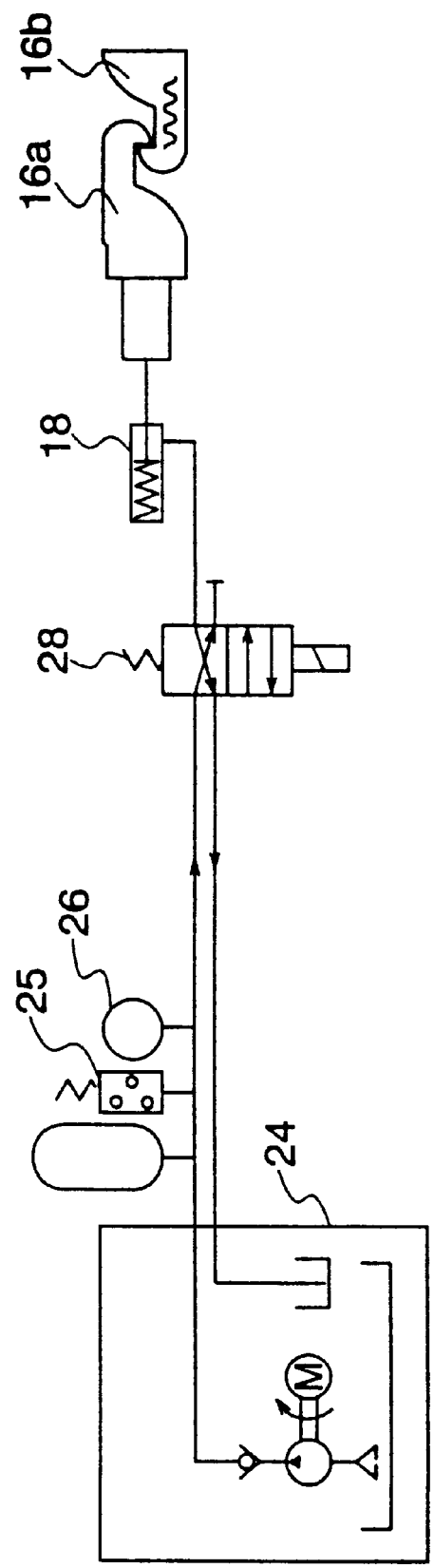
FIG. 5 is a view showing a pressure generating system in the sealing jaws in FIG. 2, FIG. 6(*a*) shows an example in which values obtained by converting the strain amount, of a strain gauge secured in the hook in FIG. 2, to pressure are continuously recorded, FIG. 6(*b*) shows waveform examples of the master data thereof, and FIG. 6(*c*) is a pressure waveform example when an abnormality occurs.

A brief outline configuration of packaging container producing equipment according to one preferred embodiment of the invention is shown in FIG. 1, and FIG. 2 shows a side elevational view of two pairs of sealing jaws in operation, which are used for the packaging container producing equipment illustrated in FIG. 1. FIG. 3 is a view, taken along the line A—A in FIG. 2, of a control mechanism of an engaging means and heating means of the sealing jaws 7. FIG. 4 illustrates a state where the engaging means of the sealing jaws 7 in FIG. 3 are separated from each other, and FIG. 5 is a view showing a pressure generating system of the sealing jaws for cross sealing.

Packaging container producing equipment according to the abovementioned preferred embodiment is a packaging container production apparatus for producing packaging containers, in which contents are filled, from plate-like web W. As shown in FIG. 1, a plate-like web W wound to be roll-like is used to form a tubular web W, wherein both ends of the abovementioned tubular web W are sealed (longitudinal sealing) in a longitudinal direction, contents are filled therein, and the tubular web W is cut off to a length equivalent to one packaging container, thereby making a pillow-like container P in which contents is filled. And this is made into a hexahedral packaging container C which is one of the final products.

In the abovementioned packaging container producing equipment, a roll-like web W of rewinder 1 is unwound, the plate-like web unwound is transferred to a tube forming device 3 via a tension applying device 2 by which tension is always given to the corresponding web W, wherein the plate-like web W is deformed to be tubular web W while being formed, the overlapped ends of the tubular web W in the web W flowing direction are sealed to each other, and the tubular web W is deformed to be square column like web W by a molding member (not illustrated) and is cut off by a cutter (not illustrated), wherein the web W is cut so as to make pillow-like packaging containers P.

The tube forming device 3 is provided with a filling pipe 5 for filling a filling liquid such as fluid food into a tube. Furthermore, the tube forming device 3 is also provided with two pairs of sealing jaws 7 (only one pair of sealing jaws is shown in FIG. 1) to seal (cross seal) web W by pressing both sides of the web W, wherein one pair of sealing jaws is caused to move along with the web W while pulling downward the tubular web W being transferred downward, and the sealing state of the web W is released after the same sealing jaws fall an appointed distance. Thereafter, each of them is caused to move in mutually separating directions. The sealing jaws are elevated an appointed distance, wherein the processes of sealing the tubular web W are repeated.

The drive of the pair of sealing jaws 7 is constituted to be movable vertically by a perpendicularly movable spline shaft 6. A cam 12 which constitutes a drive mechanism for causing the sealing jaws 7 to be elevated is connected to a cam follower 14 which is elevated and lowered along the side of the cam 12 via a connecting member 15 on the upper surface of the cam 12.

With the side of the tubular web W pressed by a pair of sealing jaws 7, the polyethylene film layer of the web W is melted by a heating member incorporated in the corresponding sealing jaws 7 so that the sides of the web W to be pressure-fit are caused to be integrated with each other, thereby performing a cross sealing.

As shown in FIG. 2, the sealing jaw 7 for cross sealing the web W consists of two pairs of sealing jaws 7, 7', and each pair of sealing jaws 7, 7' consists of heat sealing jaws 7a, 7a' for heat-sealing the web W and pressure receiving jaws 7b, 7b' to receive a compression force from the corresponding heat sealing jaws 7a, 7a'. Inductors 8, 8' are provided at the engaging portion of the heat-sealing jaws 7a, 7a' with the web W surface. Furthermore, pressure receiving bars 9, 9' and cutter 10, 10' are, respectively, secured at the engaging portion of the pressure receiving jaws 7b, 7b' with the web W. Each pair of sealing jaws 7, 7' is caused to move while pulling downward while the web W being transferred downward, simultaneously with a sealing operation of the web W, and in this process, the tubular web W is deformed into a square column like web W by forming flaps (not illustrated). However, when a pair of sealing jaws 7, 7' descends an appointed distance, cutters 11, 11' driven by the cylinders 10, 10' provided in the pressure receiving jaws 7b, 7b' cut off at nearly the middle part of the cross-sealed portion of the web W.

The sealed state of the web W by the sealing jaws 7, 7' is released by the cutters 11, 11'. Pillow-like container P is cut off, and simultaneously the downward transferring force of the square column like web W is cancelled, wherein the sealing jaws 7, 7' are caused to move in, mutually, separate directions, are elevated an appointed distance and then repeat a sealing operation of the tubular web W.

Furthermore, FIG. 3 shows a pair of sealing jaws 7, which is a view taken along with the line A—A in FIG. 2. A pair of hooks 16a, 16b is provided at both ends of the heat sealing jaw 7a and pressure receiving jaw 7b, and a cylinder 18 is connected to the hook 16a. And after the hook 16a and the hook 16b are engaged with each other as shown in FIG. 3, the heat sealing jaw 7a and pressure receiving jaw 7b are caused to be drawn near each other by operation of the cylinder 18, whereby the web W nipped between the inductor 8 and the pressure receiving bar 9 is sufficiently pressed when being cross-sealed.

Next, as shown in FIG. 4, as the engagement of the hook 16a with the hook 16b is cancelled when the cross sealing by a pair of sealing jaws 7 and cutting are carried out, the pair of sealing jaws 7 are separated from each other.

Since an eddy current is caused to flow to the aluminum foil of the web W by the inductor 8 of the heat sealing jaw 7a when the heat sealing jaw 7a and pressure receiving jaw 7b press both sides of the web W by engagement of the hook 16a and hook 16b, the aluminum foil is self-heated, and this heat melts the polyethylene film layer of the web W to cross-seal the web W.

A high frequency induction heating system for this cross sealing is illustrated in FIG. 3.

The tube forming device 3 (FIG. 1) forms plate-like web W to tubular web W, and the tubular web W is cross-sealed since the drive device (main shaft 13, etc.) for driving the sealing jaws, which is for folding the sealing jaws 7 from both sides of the web W, drives the sealing jaws 7 secured at the spline shaft 6. At this time, the drive amount (the rotating angle, etc., of the main shaft 13) of the drive device is inputted into a controller 21, wherein, on the basis of the corresponding input value, etc., the controller 21 issues an instruction to effect an output necessary for a power circuit 22 for high frequency oscillation, and the inductor 8 oscillates a high frequency current by the power circuit 22 to cause an eddy current to be generated at the aluminum foil in the web W.

FIG. 5 shows a pressure generating system for actuating the hook 16b. Oil pressure coming from the pressure generating unit 24 is sent to a cylinder 18 via a pressure lower limit detector 25, a tube at which a pressure gauge 26 is secured, and a pressure change valve 28, wherein the hook 16A is actuated.

As shown in FIG. 3, by operations of the cylinder 18, the heat sealing jaw 7a and pressure receiving jaw 7b are caused to be drawn near each other by the hook 16a being engaged with the hook 16b when carrying out a cross sealing of the web W, the web W nipped between the inductor 8 and pressure receiving bar 9 is pressed to generate a pressing force when the cross sealing is being performed, and simultaneously, a cutting pressing force of the web W is produced at the cutter 11 actuating cylinder (not illustrated).

Furthermore, a strain gauge (contact type micro deviation sensor) 23 is disposed, as shown in FIG. 3, inside one hook 16b of hooks 16a, 16b of a pair of sealing jaws 7a, 7b (the gauge may be disposed on the outer surface of the hook 16b), and the strain value of the strain gauge 23 is outputted to the controller 21.

Not being limited to the case where the strain gauge 23 is inside the hook 16b as shown in FIG. 3, the strain gauge 23 may be disposed at any position where the strain gauge 23 is able to directly monitor the sealing pressure acting on the hook 16 and also have a comparatively small measurement error. Since the hook 16a is a swinging member as shown in FIG. 4 and may becomes a factor in measurement error, it is highly recommended that the strain gauge 23 is attached to the hook 16b fixed at the pressure receiving jaw 7b of the hook 16.

Figure 7:
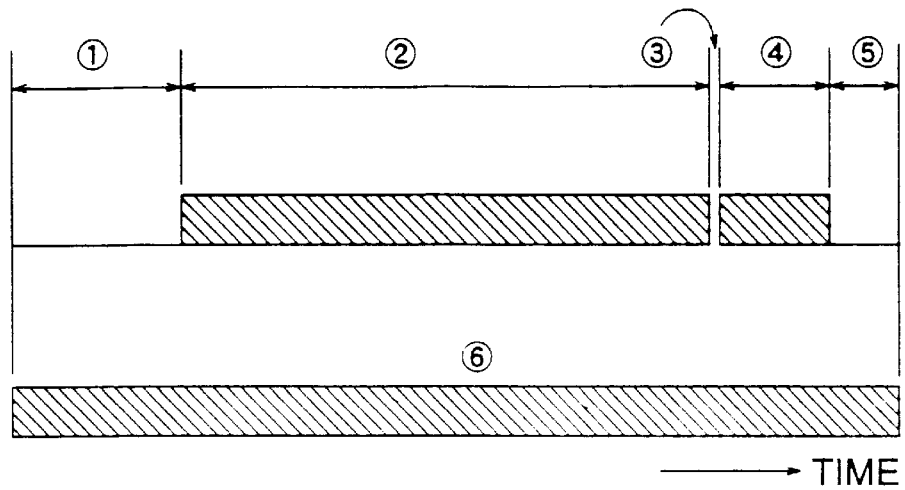
FIG. 7 is a timing chart of cross sealing of a web by the sealing jaws of the packaging container producing equipment.
Figure 8:
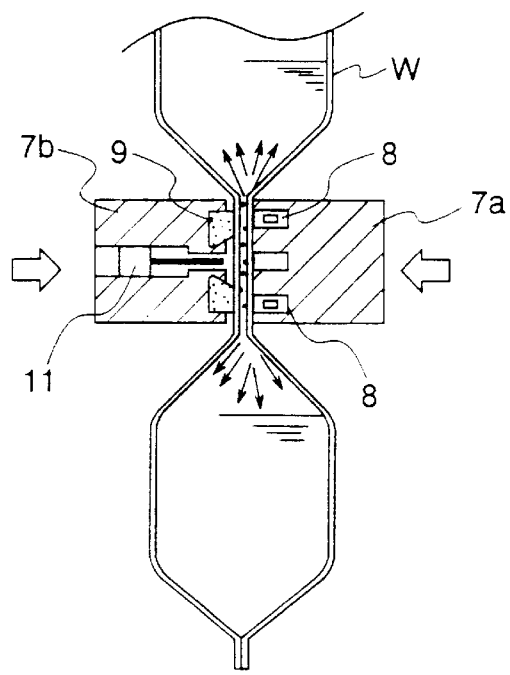
FIG. 8 is a view showing such a state where the filled liquid is excluded in a cross sealing of the web by the sealing jaws of the packaging container producing equipment.

The controller 21 controls (2) heating process, (4) cutting process and (6) compression process for a cross sealing, which are shown in FIG. 7, and thereby, with a monitoring display (not illustrated), monitors the output states such as a high frequency current value (mean value of the detected current), peak DC current value, output integration value [{mean current value (I)}$^2$×time (t)], current supplying time (oscillation time), interval time (between the current supplying time and non-supply time), and voltage value, wherein they are used as information for judging whether or not the cross sealing of a web is in good condition.

Furthermore, the controller 21 continuously stores and holds the values obtained by converting the output value (strain amount) of the strain gauge attached to the hook 16b and in the vicinity thereof to pressure in a memory (not illustrated), and compares them with the waveform of the preset master data, thereby monitoring the cross sealing state.

An example is shown in FIG. 6(a), in which the values obtained by converting the strain amount of the strain gauge to pressure are continuously recorded, and an example of waveforms of the master data is shown in FIG. 6(b). Furthermore, FIG. 6(c) shows an example of pressure waveform when an abnormal state (short heating time) occurs.

Thus, while directly monitoring the sealing pressure by hooks 16, the abovementioned sealing pressure is controlled so that the data obtained by the strain amount becomes nearly identical to the waveforms of the master data, reflecting on the adjustment of compression time, compression timing by the hooks 16, and pressing force of the hook actuating cylinder 18, and the adjustment of the drive amount of the cross sealing drive device for a pair of sealing jaws 7, etc. Since the sealing pressure of web W can be controlled, the sealing property of the web W can be improved, and the ratio of defect generation of packaging containers C can be decreased.

Figure 6:
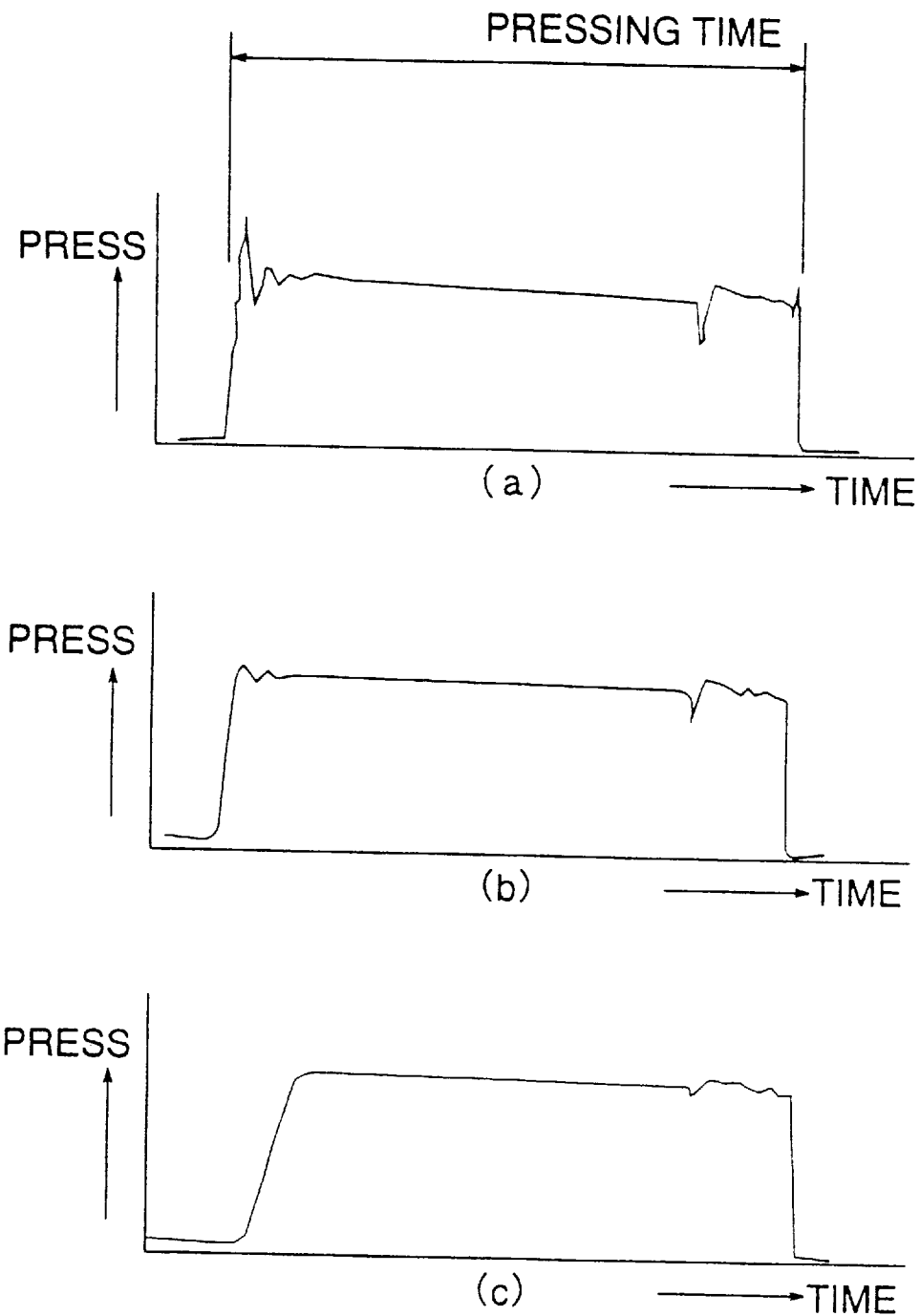

Thus, the controller 21 of the invention judges whether or not the pressure waveform exemplarily illustrated in FIG. 6, in which the value obtained by converting the strain amount of the strain gauge to pressure is continuously recorded, is an adequate value, wherein if any abnormal data is generated, a signal is outputted to a sequencer (not illustrated) to cause the drive device to stop. Furthermore, the abovementioned controller is provided with a memory function to store the outputted data, and the corresponding memory has such a capacity that it is able to store the waveform data of the packaging containers C being final products, for example, with a storage range covering the past 50 through 100 products. Therefore, even in a case where a defective product occurs with respect to the packaging containers being the final products, the past data stored in the memory is outputted to a peripheral device via the controller 21, wherein the data is taken into examination, it is possible to find the timing when the defect occurs with regard to the compressing time, compression timing by the hook 16, adjustment of the pressing force of the cylinder 18 for actuating the hook, shortage of the drive amount of the drive device for cross sealing by a pair of sealing jaws 7. Still furthermore, it is possible to search for the cause thereof. Accordingly, it is possible not only to improve the yield of production but also to obtain information for preventing such defects from occurring.

What is claimed is:

1. A web sealing device, comprising:

a member that directly gives both sides of a double web a sealing pressure, the member comprising sealing jaws to be drawn to each other and a pair of hooks which are provided at both ends of the jaws and which can be engaged with each other;

a strain instrument that is one of secured in or on the hooks; and a data recording device for storing a value obtained by converting said measured strain amount of said strain measurement instrument to pressure as data continuously recorded in line with the elapse of time, and for storing said data that are obtained during an appointed number of times of the web sealing operations.

2. A packaging container producing equipment by which a plate-like web is molded to a tubular web, a fluid filling liquid is filled in the tubular web and a packaging container is produced, said packaging container producing equipment comprising:

a strain measurement instrument that is secured at a member that directly gives both sides of a double web a sealing pressure, the member comprising sealing jaws to be drawn to each other and a pair of hooks which are provided at both ends of the jaws and which can be engaged with each other;

wherein the strain measurement instrument is one of secured in or on the hooks; and a storing device that stores a value obtained by converting the measured strain amount to pressure as data continuously recorded in line with the elapse of time and the data that are obtained during an appointed number of times of the past web sealing operations.

* * * * *